United States Patent
Sorrentino

(10) Patent No.: US 8,699,609 B2
(45) Date of Patent: Apr. 15, 2014

(54) METHODS AND ARRANGEMENTS FOR PEAK TO AVERAGE POWER RATIO REDUCTION

(75) Inventor: Stefano Sorrentino, Solna (IT)

(73) Assignee: Optis Cellular Technology, LLC, Plano, TX (US)

( * ) Notice: Subject to any disclaimer, the term of this patent is extended or adjusted under 35 U.S.C. 154(b) by 104 days.

(21) Appl. No.: 13/130,854

(22) PCT Filed: Nov. 27, 2008

(86) PCT No.: PCT/SE2008/051363
§ 371 (c)(1),
(2), (4) Date: May 24, 2011

(87) PCT Pub. No.: WO2010/062230
PCT Pub. Date: Jun. 3, 2010

(65) Prior Publication Data
US 2011/0228878 A1   Sep. 22, 2011

(51) Int. Cl.
*H04B 7/02* (2006.01)
*H04L 1/02* (2006.01)

(52) U.S. Cl.
USPC .......................................................... 375/267

(58) Field of Classification Search
USPC .......................................................... 375/295
See application file for complete search history.

(56) References Cited

U.S. PATENT DOCUMENTS

| | | | |
|---|---|---|---|
| 2007/0060180 A1* | 3/2007 | Muharemovic et al. | 455/509 |
| 2008/0075191 A1* | 3/2008 | Haartsen | 375/285 |
| 2009/0046694 A1* | 2/2009 | Matsumoto et al. | 370/343 |
| 2009/0128381 A1* | 5/2009 | Choi et al. | 341/106 |
| 2011/0064175 A1* | 3/2011 | Leyonhjelm et al. | 375/350 |

FOREIGN PATENT DOCUMENTS

| | | |
|---|---|---|
| WO | 2004/006479 A1 | 1/2004 |
| WO | 2006/014141 A1 | 2/2006 |

* cited by examiner

*Primary Examiner* — Chieh M Fan
*Assistant Examiner* — Tanmay Shah
(74) *Attorney, Agent, or Firm* — Carstens & Cahoon, LLP; Vincent J. Allen

(57) ABSTRACT

The present invention relates to a transmitter and to a receiver and methods thereof wherein the PAPR is reduced by applying a set of different phase rotations to the output of each DFT of the transmitter. A corresponding set of inverse phase rotations are applied to the input of the IDFT of the receiver. The set of phase rotations applied to the subcarriers at the output of the DFT precoder of the transmitter results in a circular time shift of the corresponding time domain at the output of the IDFT modulator. If the phase rotations are properly selected for each DFT precoder, the probability that signal peaks sum in a constructive way at the output of the IDFT modulators is reduced, with a consequent reduction of the PAPR.

19 Claims, 13 Drawing Sheets

METHODS AND ARRANGEMENTS FOR PEAK TO AVERAGE POWER RATIO REDUCTION

TECHNICAL FIELD

The present invention relates to transmitters and receivers and methods thereof for reducing the Peak To Average Power Ratio (PAPR).

BACKGROUND

The access method Orthogonal Frequency Division Multiplexing (OFDM) is currently a popular modulation concept for next generation wireless systems e.g., 3GPP LTE ($3^{rd}$ Generation Partnership Project Long Term Evolution), IEEE WiMAX 802.16x, IEEE WiFi 802.11x, etc., as OFDM allows flexible resource allocation over wide bandwidth and practical channel equalization. However, the OFDM signal is characterized by large fluctuations of its power envelope that result in occasional spikes in the power of the signal. Therefore, OFDM systems should be designed allowing large power margins (referred to as power back-off), because the RF PA (Radio Frequency Power Amplifiers) as well as other digital and analog components need to be dimensioned in order to handle the occasional power peaks of the OFDM signal.

Various metrics have been introduced for the quantification of the dispersion of the histogram of the power envelope of OFDM signals. The most common one is the Peak to Average Power Ratio (PAPR) which is defined as $$PAPR = \frac{\|y(t)\|_\infty^2}{P_y},$$

where y(t) is the transmitted baseband signal, Py is its power and $\| \|_\infty$ is the infinite-norm operator.

For energy, cost, or space critical designs, such as mobile devices, the power back-off margins required by OFDM would lead to an inefficient solution. Therefore, a modified OFDM modulation, namely Discrete Fourier Transformation Spread Orthogonal Frequency Division Modulation (DFTS-OFDM) (also known as Single Carrier Orthogonal Frequency Division Modulation (SC-OFDM)), may be used to improve the efficiency of uplink transmissions, i.e., to reduce the PAPR. In a DFTS-OFDM transmitter a DFT precoder is placed before the IDFT precoder and a corresponding IDFT block it placed in the receiver. DFTS-OFDM leverages lower PAPR than OFDM, but at the same time it keeps the main advantage of OFDM which consists of simple equalization procedures. Therefore, the use of DFTS-OFDM leads to lower power back-off margins in the power amplifier (PA) and other components of the transmitter.

Further, the evolution of wireless communication systems towards the $4^{th}$ Generation (4G) envisages also the adoption of spatial processing schemes for the multi-antenna (e.g. Multiple Input Multiple output, MIMO) transmission in the uplink. Various strategies have been proposed recently in order to exploit the multiple antennas for improving system performance including, e.g., STC (Space Time Coding), SFC (Space Frequency Coding), STFC (Space Time Frequency Coding) and LDC (Linear Dispersion Codes). In the following we implicitly assume the use of a specific type of LDC termed as SMLP (Spatial Multiplexing with Linear Precoding), because it is currently the main candidate for the uplink spatial processing of evolved LTE systems. SM (Spatial Multiplexing) consists of the simultaneous transmission of multiple data streams on the same time and frequency resources by taking advantage of the multiple transmit antennas. In order for the receiver to be able to separate the transmitted streams and correctly decode them the number of multiplexed streams must not be greater than the minimum of the number of transmit and receive antennas. Therefore, for SM it is necessary that both the transmitter and the receiver are provided with multiple antennas. In case of MIMO-DFTS-OFDM systems employing SM, an independent transmission chain is applied to each spatial stream, including DFT precoding, IDFT modulator and CP insertion. Each generated symbol is applied to a different transmit antenna, therefore every transmit antenna delivers the signal coming from a single specific spatial stream.

SMLP is a refined SM technique where each transmit antenna carries a linear combination of the spatial streams, instead of a single spatial stream as in standard SM. If the linear weights that define how each stream is mapped to each antenna are properly chosen, SMLP outperforms SM by focusing the transmit energy in the most favorable propagation subspaces of the channel. In a MIMO-DFTS-OFDM system the linear combination of the transmitted streams is usually carried out between the DFT precoders and the IDFT modulators.

SMLP potentially provides increased throughput for MIMO enabled devices and is foreseen as one of the major technical innovations for the uplink of forthcoming wireless telecommunication systems. In the following, a DFTS-OFDM system comprising of SMLP will be shortly termed as MIMO-DFTS-OFDM.

Turning to FIG. 1a showing a conventional MIMO DFTS-OFDM system with Ntx antennas 190 and Ns data streams 100 simultaneously transmitted on the same bandwidth. Ns DFT precoders 130 are simultaneously employed, each applied to a different stream. The DFT precoder 130 transforms the signal from the time domain to the frequency domain, therefore each output of the DFT precoder will be called subcarrier in the following. Hence in the figures, the subcarriers are denoted by arrows stemming out of the DFT precoder in the transmitter and as arrows stemming out of the IDFT demodulator in the receiver. Each DFT precoder 130 has size K and provides input to the Spatial Processing block 140 which may be built of a set of LP matrices B(k), each of them with dimensions (Ntx×Ns). The index k in B(k) provides the possibility to employ a different LP matrix on each subcarrier at the output of the DFT precoders, thus allowing subcarrier-adaptive LP in the most general case. Each LP matrix B(k) is fed with all the Ns outputs of the Ns precoders corresponding to the kth subcarrier and generates Ntx samples per subcarrier to be fed to the Ntx IDFT blocks as in FIG. 1a. Each IDFT block 160 has size M≥K and reverts the signal to the time domain to feed a dedicated RF section 180 and PA (power amplifier). By properly mapping the K scheduled subcarriers to the M inputs of the IDFT, it is possible to select the part of the available spectrum employed for transmission.

Further, the conventional MIMO DFTS-OFDM system of FIG. 1a comprises channel coding blocks 110. The input of each channel coding block consists of data streams 100, providing from some application running at the transmitter side or from a control service of the system (e.g., control signaling). The channel coding blocks 100 generate coded bits as an output, according to some suitable Forward Error Correction (FEC) Coding algorithm The modulators 120 take as an input the sequence of the coded bits providing from the Channel Coding block 100 and maps them to a sequence of symbols. Each symbol consists of a possibly complex number belonging, e.g., to a widely employed signal constellation such as PAM, PSK, or QAM constellations. Accordingly, each modulated data stream is being input to one of the DFT pre-coders.

After the DFT precoder the Spatial Processing block 140 processes the various streams in the spatial domain and generates the signals to be fed to each transmit antenna 190. If LP is employed, the Spatial Processing block generates the Ntx outputs for each subcarrier by multiplying the corresponding Ns incoming streams with a Ntx×Ns matrix B(k), where k is the subcarrier index.

The subcarrier mapping block 150 is governed by resource mapping and scheduling functions in the upper layers of the system. It maps the output of the spatial processing block to a subset of the inputs of the IDFT block.

The Inverse Discrete Fourier Transformation (IDFT) 160 transforms the incoming signal from the frequency domain (subcarrier) to the time domain as described above. Since the length of the IDFT (M) is usually a power of 2, efficient algorithms such as IFFT (Inverse Fast Fourier Transformation) are widely and equivalently used. In order to simplify channel equalization at the receiver, it is common practice to replicate part of the transmitted OFDM symbol in the time domain.

This technique is widely known as Cyclic Prefix (CP) and is employed, e.g., in 3GPP LTE. Each signal is then fed to a respective antenna via a dedicated RF section comprising e.g. power amplifiers.

However, it can be shown by numerical simulations that the PAPR of a MIMO DFTS-OFDM is larger (worse) than in the case of a DFTS-OFDM system with equivalent bandwidth. This results in a larger power back-off for the PA and thus increased cost, energy consumption and space occupation, especially for the RF part of mobile devices. It is therefore of great importance to introduce technical features that are able to reduce the PAPR of the signal without hampering the advantages of the MIMO DFTS-OFDM system.

The theoretical reason why the PAPR of the MIMO DFTS-OFDM system increases with respect to conventional DFTS-OFDM is that BF combines independent data streams on each antenna. It is easy to show with the central limit theorem that the statistical distribution of the signal at the input of the PA of a MIMO system with BF tends to a Gaussian distribution for an increasing number of streams Ns. The Gaussian distribution is characterized by long queues and has thus bad PAPR properties. Therefore, peak power values and high PAPR are more likely to occur in the MIMO system with BF.

In addition to the aspects related to multi antennas, the evolution towards 4G systems (such as LTE-Advanced) requires the adoption of flexible resource allocation strategies over larger and possibly discontinuous spectrum windows referred to as multicarrier transmission. Each contiguous part of the assigned spectrum is called a carrier in the following of this description and it is uniquely identified by index n. One uplink scheme for multicarrier OFDM is referred to as NxDFTS-OFDM. NxDFTS-OFDM may be regarded as the natural evolution of SC-OFDM towards multicarrier transmission. In NxDFTS-OFDM an independent DFT precoder is assigned to each carrier or, more generally, to each assigned sub-band. A common IDFT is employed in the case of common PA for all the aggregated carriers.

FIG. 1*b* illustrates schematically a NxDFTS-OFDM system where N DFT precoders are simultaneously employed. The n-th DFT precoder has size Kn and its output is mapped to subcarriers dn . . . dn+Kn−1 at the input of a size M IDFT block. The underlying assumption is that each DFT is associated to a different carrier of a multicarrier system. However, the case where multiple DFTs are assigned to the same carrier is also covered by the same architecture.

The conventional NxDFTS-OFDM system comprises channel coding blocks 192, modulators 193, DFT-precoders 194, sub-carrier mappers 195, IDFT 196, a CP block 197 and a RF-block 198 with PA, which all have substantially the same functionality as the corresponding blocks of the MIMO DFTS-OFDM system shown in FIG. 1*a*. Further, in case of NxDFTS-OFDM, the subcarriers are mapped to N distinct clusters by the subcarrier mapper. Each cluster consists of all the Kn subcarrier relative to the n-th carrier.

It can be shown by numerical simulations that the PAPR of NxDFTS-OFDM is larger (worse) than in the case of a SC-OFDM system with equivalent bandwidth. This results in larger power back-off requirement for the PA similarly to the MIMO case. It is therefore of great importance to introduce technical features that are able to reduce the PAPR of the signal without hampering the advantages of the NxDFTS-OFDM system.

SUMMARY

Hence the object of the present invention is to provide a PAPR reduction technique for multicarrier systems with a common PA for all carriers and a PAPR reduction technique for MIMO DFTS-OFDM systems.

The present invention relates to a transmitter and to a receiver and methods thereof. Thus, the objective is achieved by the applying a set of different phase rotations to the output of each DFT of the transmitter. A corresponding set of inverse phase rotations are applied to the input of the IDFT of the receiver. The set of phase rotations applied to the subcarriers at the output of the DFT precoder of the transmitter results in a circular time shift of the corresponding time domain at the output of the IDFT modulator. If the phase rotations are properly selected for each DFT precoder, the probability that signal peaks sum in a constructive way at the output of the IDFT modulators is reduced, with a consequent reduction of the PAPR.

The receiver must be aware of the set of phase rotations that is applied to each DFT precoded signal and to be able to compensate for it during demodulation. According to one embodiment, the phase-shifts applied to each DFT precoded signal are defined a-priori for all the combinations of DFT sizes of practical interest. As an example, a specific set of phase shifts may be defined for each allowed setting of system parameters such as the lengths of the IDFT and DFT blocks and the number of streams and carriers. The employed phase shifts may thus be stored in a predefined lookup table which is known by both the transmitter and receiver. Since the receiver may be aware of the aforementioned system settings it may therefore be able to employ the correct set of phase correction coefficients without any need to explicit signal them.

According to a first aspect of the present invention an OFDM transmitter is provided. The OFDM transmitter comprises a plurality of DFTs for transforming a plurality of modulated data streams into the frequency domain, a plurality of subcarrier mappers for mapping the output of the DFTs onto subcarriers, at least one IDFT for transforming the DFT output mapped onto the subcarriers back to the time domain, at least one power amplifier amplifying the output of the IDFT, and transmitting means for transmitting at least one power amplified data stream. According to the present invention, the transmitter further comprises a phase rotation block adapted to apply a specific phase rotation to each output of each DFT, where the value of the phase rotation is a linear function of a subcarrier index.

According to a second aspect of the present invention an OFDM, receiver is provided. The OFDM receiver comprises receiving means for receiving at least one OFDM modulated data stream, at least one DFT for transforming the OFDM modulated data stream into the frequency domain, a plurality of subcarrier demappers for demapping the output of the at least one DFT onto subcarriers, and a plurality of inverse DFTs, IDFTs, for transforming the output of the DFTs mapped onto the subcarriers back to the time domain. According to the present invention, the receiver further comprises a phase correction block adapted to apply a specific phase correction to each input of each IDFT, where the value of the phase correction is a linear function of a subcarrier index.

According to a third aspect of the present invention a method is provided. The above described transmitter provided by the present invention is adapted to perform the following steps: DFT transforming a plurality of modulated data streams into the frequency domain, mapping the DFT transformed modulated data streams onto subcarriers, IDFT transforming the DFT output mapped onto the subcarriers back to the time domain, amplifying the output of the IDFT, transmitting at least one power amplified data stream, and applying a specific phase rotation to each output of each DFT, where the value of the phase rotation is a linear function of a subcarrier index.

According to a fourth aspect of the present invention a further method is provided. The above described receiver provided by the present invention is adapted to perform the following steps: receiving at least one OFDM modulated data stream, transforming the OFDM modulated data stream into the frequency domain, mapping the output of the at least one DFT onto subcarriers, transforming the output of the DFTs mapped onto the subcarriers back to the time domain, and applying a specific phase correction to each input of each IDFT, where the value of the phase correction is a linear function of a subcarrier index.

The value of the phase rotation may be a linear function of the subcarrier index and the parameters defining the phase rotation as a function of the subcarrier index may be specific of each DFT precoder.

According to embodiments of the present invention, the transmitter and the receiver may be adapted for multicarrier OFDM or MIMO, or both. If the transmitter and receiver are adapted for MIMO, the transmitter comprises a spatial processing unit while the receiver comprises a spatial combiner.

If the modulator of the transmitter is adapted to apply multicarrier OFDM modulation, the number of modulated data streams may correspond to the number of carriers of the multi carrier OFDM and if the transmitter is adapted to apply MIMO the number of MIMO antennas corresponds to the number of the plurality of modulated data streams to be used for the MIMO, transmission and the phase rotation is configured to depend at least on said number of data streams.

In addition, the transmitter and the receiver may be configured for wired or wireless transmission.

According to a further embodiment, information indicating the phase shifts values are explicitly signaled by the transmitter to the receiver by use of a dedicated signaling protocol.

Thus, an advantage with the present invention is that OFDM systems can be designed with smaller power margins (referred to as power back-off), because the occasional power peaks of the OFDM signal are reduced.

A further advantage with embodiments of the present invention is that the throughput is not affected and the implementation costs are negligible.

DETAILED DESCRIPTION

Figure 1A:
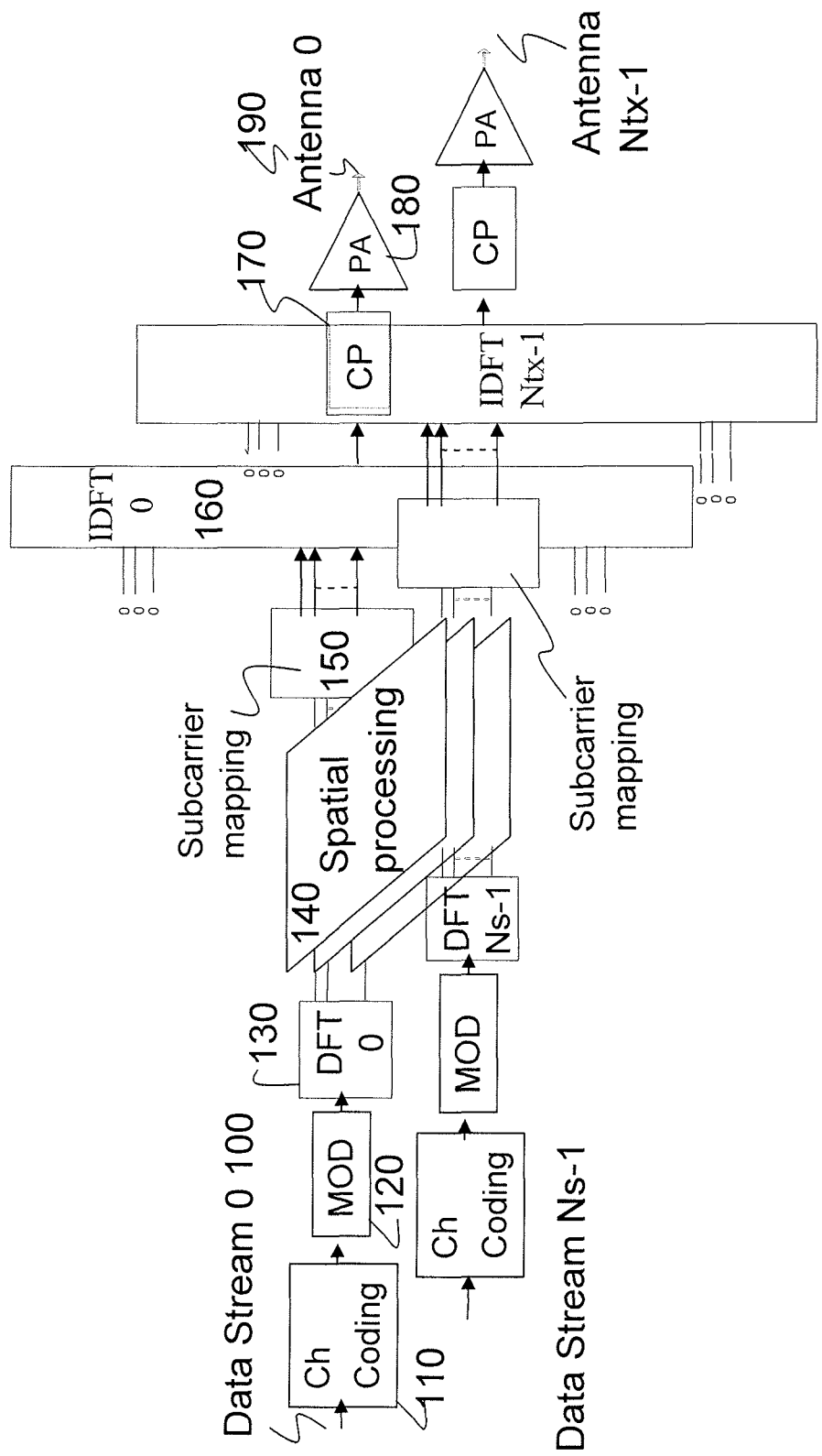
FIG. 1a illustrates a conventional MIMO DFTS-OFDM system with N tx antennas and Ns streams simultaneously transmitted on the same bandwidth according to prior art.

As stated above, the object of the present invention is to reduce the PAPR for DFTS-OFDM systems where the input of each power amplifier (PA) consists of a combination of multiple DFTS-OFDM signals. This occurs, e.g., in MIMO-DFTS-OFDM, NxDFTS-OFDM or a combination of these schemes, i.e., a multicarrier transmitter (NxDFT-OFDM transmitter) where MIMO precoding is possibly applied to some or all of the employed carriers. Such schemes suffer from high PAPR because independent signals sum in the time domain before the PA and alter the statistics of the baseband signal, occasionally generating high power spikes. Furthermore the embodiments of the present invention are explained in the context of a wireless cellular communication system such as a LTE network. It should however be understood that the embodiments of the present invention are not limited to LTE or to wireless communication systems, which implies that the channels may be wired or wireless channels. If the channels are wired channels, the antennas are replaced by digital-to-analogue converters and by analogue processing means for transmission of the signal.

Due to the different lengths of the DFT/IDFT blocks, the PAPR is not equally distributed on all the baseband samples of the signal. Some samples suffer from higher PAPR while others have lower PAPR, and this happens with periodicity of M/K samples (where K is the DFT length and M is the IDFT length in the transmitter).

In the embodiments of the present invention, PAPR reduction is achieved by applying a predefined phase rotation to each of the DFT precoders outputs of the DFT'S-OFDM transmitters. Each output of the DFT is a complex number, i.e., a number characterized by a real and an imaginary part. It is well known that a complex number may be alternatively represented by its absolute value and phase. A phase rotation is achieved when the phase of the complex number is changed without affecting the absolute value. A phase rotation of ω radians may be implemented, e.g., by multiplication of the complex number x with the complex exponential term exp(jω), where j is the imaginary unit and exp( ) is the exponential function. As illustrated below in conjunction with equation 1, each DFT has an index n and the value of the phase rotation depends on the index n. Accordingly, a corresponding phase correction block applies a corresponding phase correction to each of the IDFT inputs of the DFTS-OFDM receiver. The phase rotations performed in the frequency domain (i.e., after each DFT block) result in a circular time shift of the baseband signal at the output of the transmitter. Since each DFT precoder is associated with a specific phase rotation coefficient, the baseband signal providing from each DFT precoder experiences a different time shift. If the phase rotation coefficients ($\phi_n$ and $\theta_n$ in equation (1) defined below) are properly set, samples with high PAPR from different DFT precoders are scrambled (shifted) in the time domain. This time-scrambling of the modulated signals implies a reduction of the probability of power spikes which reduces the PAPR of the signal at the output of each DFT modulator, i.e., at the input of each PA.

Hence the present invention relates to an OFDM transmitter and to an OFDM receiver, e.g wireless OFDM transmitters and receivers.

Figure 2A:
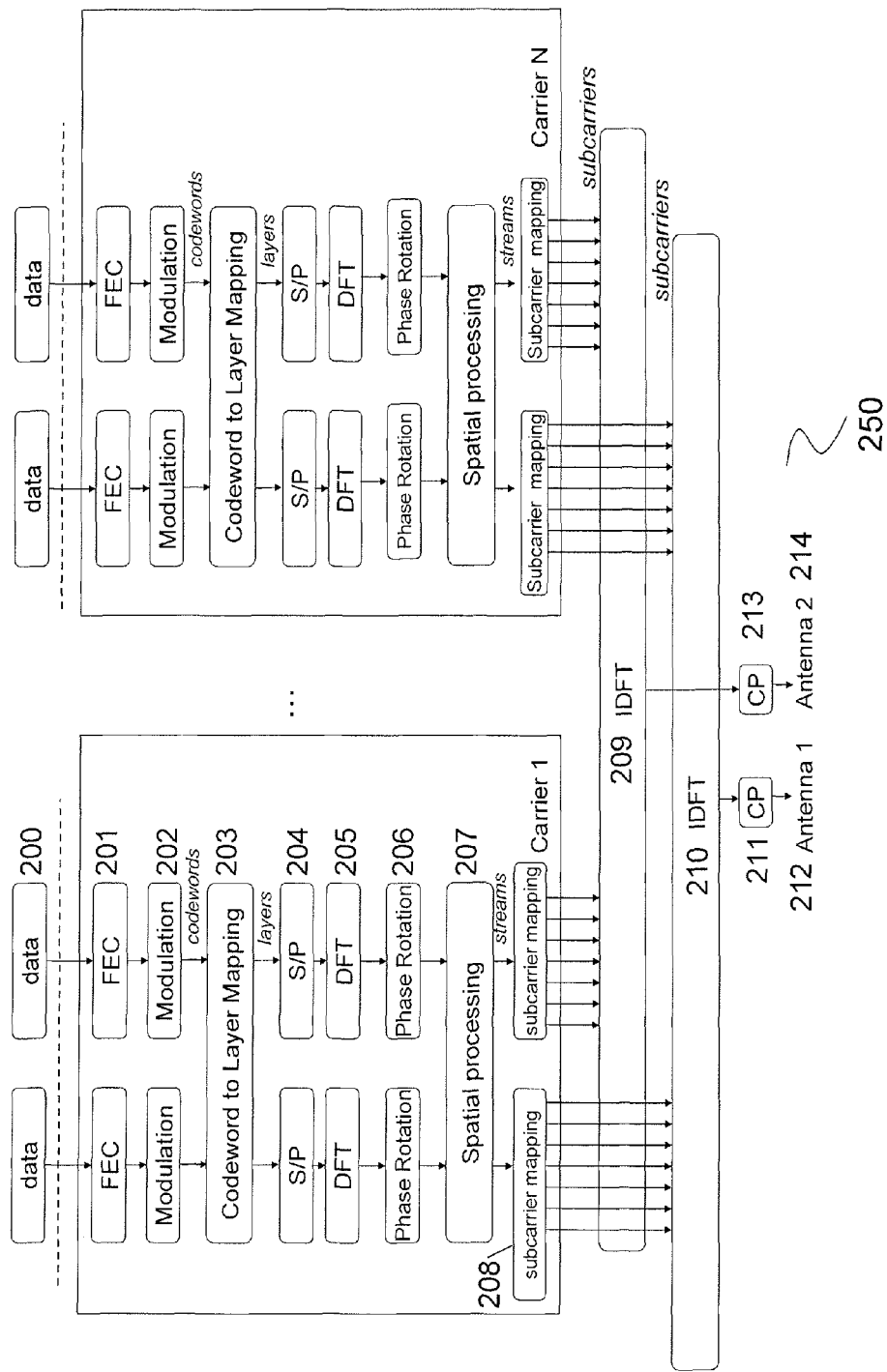
FIG. 2a illustrates an OFDM transmitter according to an embodiment of the present invention.

Such a wireless OFDM transmitter comprises, according to one embodiment as illustrated in FIG. 2a, Forward Error Correction (FEC) blocks 201, modulation blocks 202, codeword to layer mapping blocks 203, serial-to-parallel blocks 204, DFT blocks 205, phase rotation blocks 206, spatial processing blocks 207, subcarrier mapping blocks 208, IDFT blocks 209,210 and CP-blocks 211, 213 associated with a respective antenna 212, 214 and associated power amplifiers.

The FEC block 201 receives as input a data bits sequence 200 and generates a sequence of (possibly coded) bits, ready to be modulated before transmission. The FEC block comprises one or several sub-blocks, including, e.g., channel coding blocks. The channel coding blocks generate coded bits as an output, according to some suitable Forward Error Correction (FEC) coding algorithm.

The modulator 202 takes as an input the sequence of bits providing from the channel coding block and maps them to a sequence of symbols. Each symbol consists of a (possibly complex) value belonging, e.g., to a widely employed signal constellation such as PAM, PSK, or QAM constellation. The output of each modulator 202 is termed as a codeword.

Each codeword is mapped to a certain layer by the Codeword to Layer Mapping block 203. Multiple codewords may be mapped to a single layer or, as the opposite case, a single codeword may be mapped to multiple layers. As a special case, each codeword is individually mapped to a different layer. Each layer belonging to the nth carrier in a certain OFDM symbol comprises of $K_n$ symbols.

The serial to parallel block 204 buffers the $K_n$ symbols providing from each layer on each carrier and applies them to the subsequent DFT block.

Further, the DFT-block 205 has a length of $K_n$. A FFT (Fast Fourier Transformation) block may be equivalently employed if $K_n$ is a power of 2.

The phase rotation block 206 performs an element-wise phase-rotation of each of the $K_n$ outputs of the relative DFT. The phase rotation is implemented, e.g., by multiplying the considered element with a generic function of the form $X_{n,s}^R(z)=X_{n,s}(z)g(z)$. According to an example, the phase rotation may be implemented as $$X_{n,s}^R(z)=X_{n,s}(z)\exp(-j2\pi\phi_{n,s}z/M+\theta_{n,s}) \qquad (1)$$

Here $X_{n,s}(z)$ is the z:th sample of the signal providing from the s:th DFT relative to the n:th carrier, $X_{n,s}^R(z)$ is the corresponding rotated signal, $\theta_{n,s}$ is a constant phase offset term, $\phi_{n,s}$ is a phase rotation-speed term, M is the length of the IFFT in the transmitter, $j=\sqrt{-1}$ is the imaginary unit and exp( ) is the exponential function.

If the transmitter is provided with multiple antennas 212 it is convenient to process the transmit signal in the spatial domain (i.e., across the transmit antennas) in order to increase the system performance by the spatial processing block 207. Various strategies are possible for MIMO transmission including, e.g., STC (Space Time Coding), SFC (Space Frequency Coding), STFC (Space Time Frequency Coding) and LDC (Linear Dispersion Codes). In the following we focus on a type of LDC termed as SMLP (Spatial Multiplexing with Linear Precoding), because it is currently the main candidate for the uplink spatial processing of evolved of LTE systems. However, the application of embodiments of the present invention is more general since it is not limited to a specific type of spatial processing technique. SMLP is a refined SM technique where each transmit antenna carries a linear combination of the spatial streams, instead of a single spatial stream as in standard SM. If the linear weights that define how each stream is mapped to each antenna are properly chosen, SMLP outperforms SM by focusing the transmit energy in the most favorable propagation subspaces of the channel. In a MIMO-DFTS-OFDM system the linear combination of the transmitted streams is achieved by multiplying the Ns signals corresponding to the kth subcarrier and providing from the Ns DFT precoders with a Nt×Ns spatial precoding matrix B(k). Therefore, Nt signals, each of length $K_n$, are present at the output of the Spatial Processing Block 207. If MIMO processing is employed jointly with NxDFTS-OFDM (referred to as MIMO-NxDFTS-OFDM) an independent Spatial Processing Block is applied to each of the N carriers.

The subcarrier mapping block 208 is governed by the scheduling functions in the upper layers of the system. It maps the output of the spatial processing block to a subset of the inputs of the IDFT block, on a stream by stream fashion. In case of NxDFTS-OFDM, the subcarriers are mapped to N distinct clusters of subcarriers. Each cluster consists of $K_n$ subcarriers relative to the n-th carrier.

The Inverse Discrete Fourier Transformation (IDFT) transforms the incoming signal form the frequency domain (subcarrier) to the time domain. Since M, the length of the IDFT, is usually a power of 2, efficient algorithms such as IFFT (Inverse Fast Fourier Transformation) may be equivalently used.

In order to simplify channel equalization at the receiver, it is common practice to replicate part of the transmitted OFDM symbol in the time domain. This technique is widely known as Cyclic Prefix (CP) 211.

The RF block comprises analog processing functions at the transmitter including, among others, an individual Power Amplifier (PA) for each transmit antenna.

It should be noted that the description of FIG. 2a is valid for multicarrier (NxDFTS), MIMO and multicarrier in combination with MIMO. If MIMO is applied, then there is only one DFT-Spatial Proc-IDFT (and corresponding block at the receiver). If there is only multicarrier without MIMO, then the Spatial processing block is skipped, or equivalently, the spatial processing block B(k) is an identity matrix.

It should also be noted that an equivalent processing chain at the transmitter may be obtained by rearranging the order and some functionalities of the different processing blocks in some cases. This depends on that most of the blocks apply linear processing.

Figure 2B:
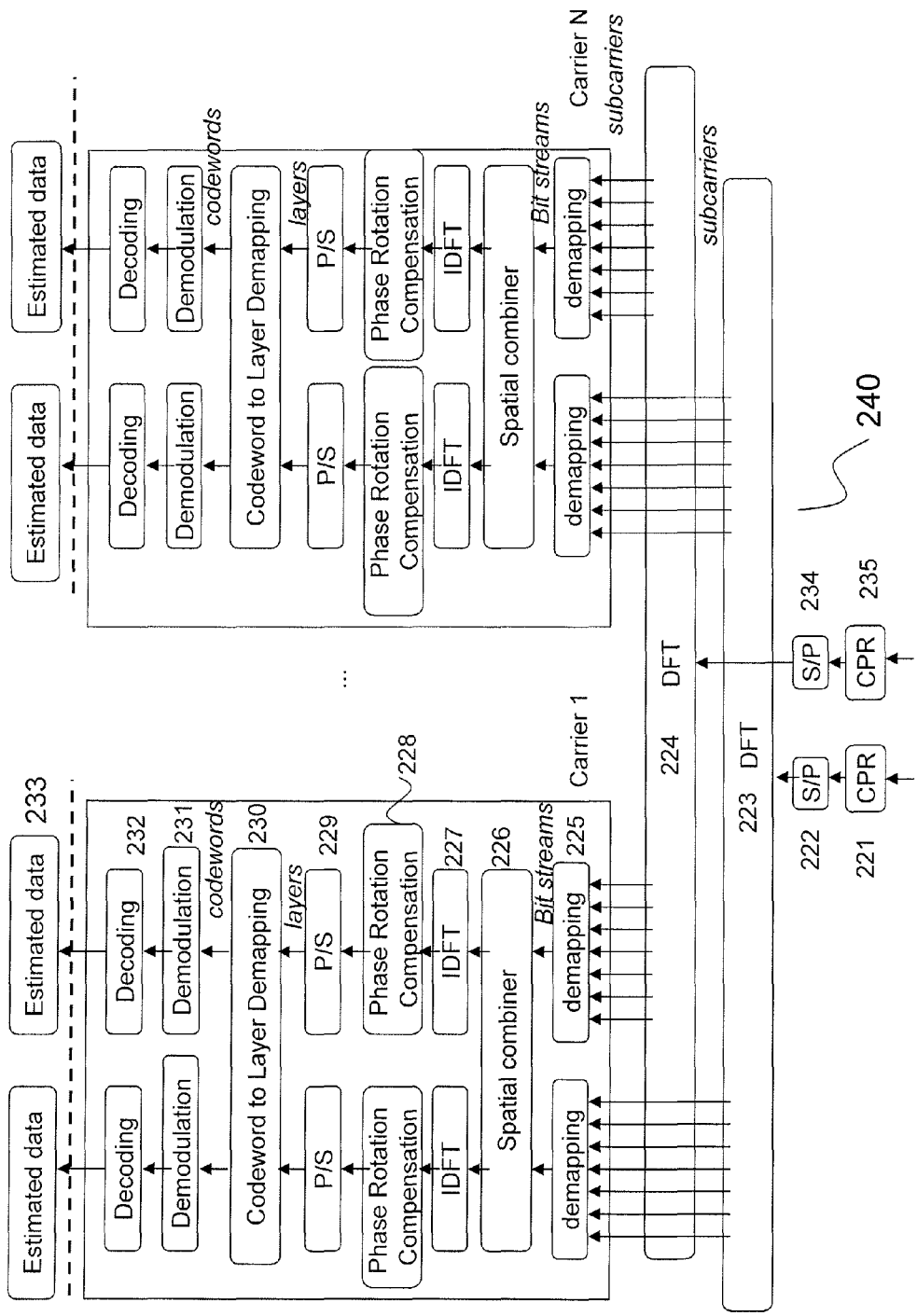
FIG. 2b illustrates an OFDM receiver according to an embodiment of the present invention.

The wireless OFDM receiver comprises antenna receiving means 220, 236 for wirelessly receiving the OFDM modulated signal from the transmitter in accordance with FIG. 2b. The receiver further comprises at least one Discrete Fourier Transformer (DFT) 223, 224 for transforming the OFDM modulated signal into the phase domain, a plurality of subcarrier demappers 225 for mapping the output of the at least one DFT onto subcarriers, a plurality of inverse DFTs (IDFTs) 227 for transforming the output of the DFTs mapped onto the subcarriers back to the time domain, and a phase correction block 228 adapted to apply a set of different phase rotations to an input of each IDFT.

The blocks employed at the receiver perform the inverse operations with respect to the corresponding blocks at the transmitter. However, an equivalent implementation is also possible with different blocks order and functionalities.

To further illustrate the receiver according embodiments of the present invention, some of the receiver blocks are further described below. The cyclic prefix removing (CPR) block 221, 235 eliminates the CP from the received signal of each antenna, the subcarrier demapping block 225 retrieves the signal corresponding to each carrier from the corresponding subcarriers, according to the allocation performed at the transmitter side and the spatial combiner 226 retrieves the signals corresponding to the different layers from the received signal. The spatial combiner 226 block may be merged with the demodulation 231 and decoding blocks 232 if non linear decoding algorithms are employed. Further, the codeword to layer demapping 230 retrieves the codewords from the layers, performing the inverse operation of the corresponding block at the transmitter.

The phase compensation block 228 compensates the artificial phase terms introduced by the phase rotation block at the transmitter. An element-wise phase-rotation of each of the $K_n$ inputs is performed and the signal is passed to the subsequent IDFT. Assuming that the phase rotation according to equation (1) has been employed at the transmitter, the phase rotation is implemented, e.g., by multiplying the considered element with a complex exponential of the form $$Y_{n,s}(z)=Y_{n,s}^R(z)\exp(j2\pi\phi_{n,s}z/M-\theta_{n,s}) \quad (2)$$

Here $Y_{n,s}^R(z)$ is the zth sample of the signal providing corresponding to the sth IDFT relative to the nth carrier, $Y_{n,s}(z)$ is the corresponding rotation-compensated signal and $\theta_{n,s}$ and $\phi_{n,s}$ are the phase rotation terms that have been employed at the transmitter.

Note that the $\theta_{n,s}$ and $\phi_{n,s}$ can be obtained at the transmitter and at the receiver by looking in a precompiled table, as a function of allocation parameters (e.g., M and Kn). Alternatively they can be signalled by the transmitter to the receiver.

The OFDM transmitter and the receiver may be implemented in software, hardware or in any combination thereof. One way to implement the embodiments of the present invention is to use digital signalling processing units, which may imply a software solution.

Figure 3:
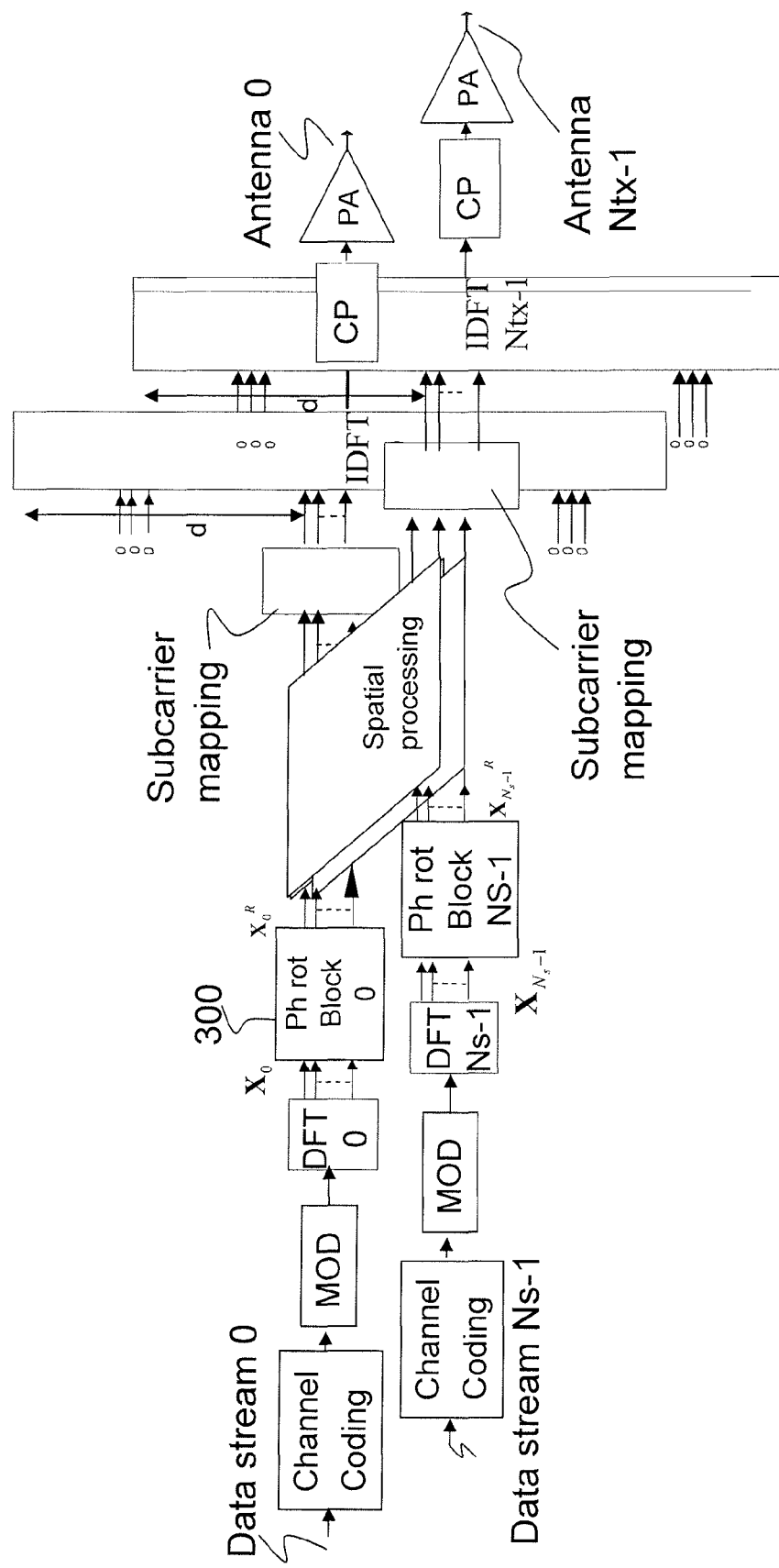
FIG. 3 illustrates a MIMO DFTS-OFDM transmitter according to one embodiment of the present invention.
Figure 4:
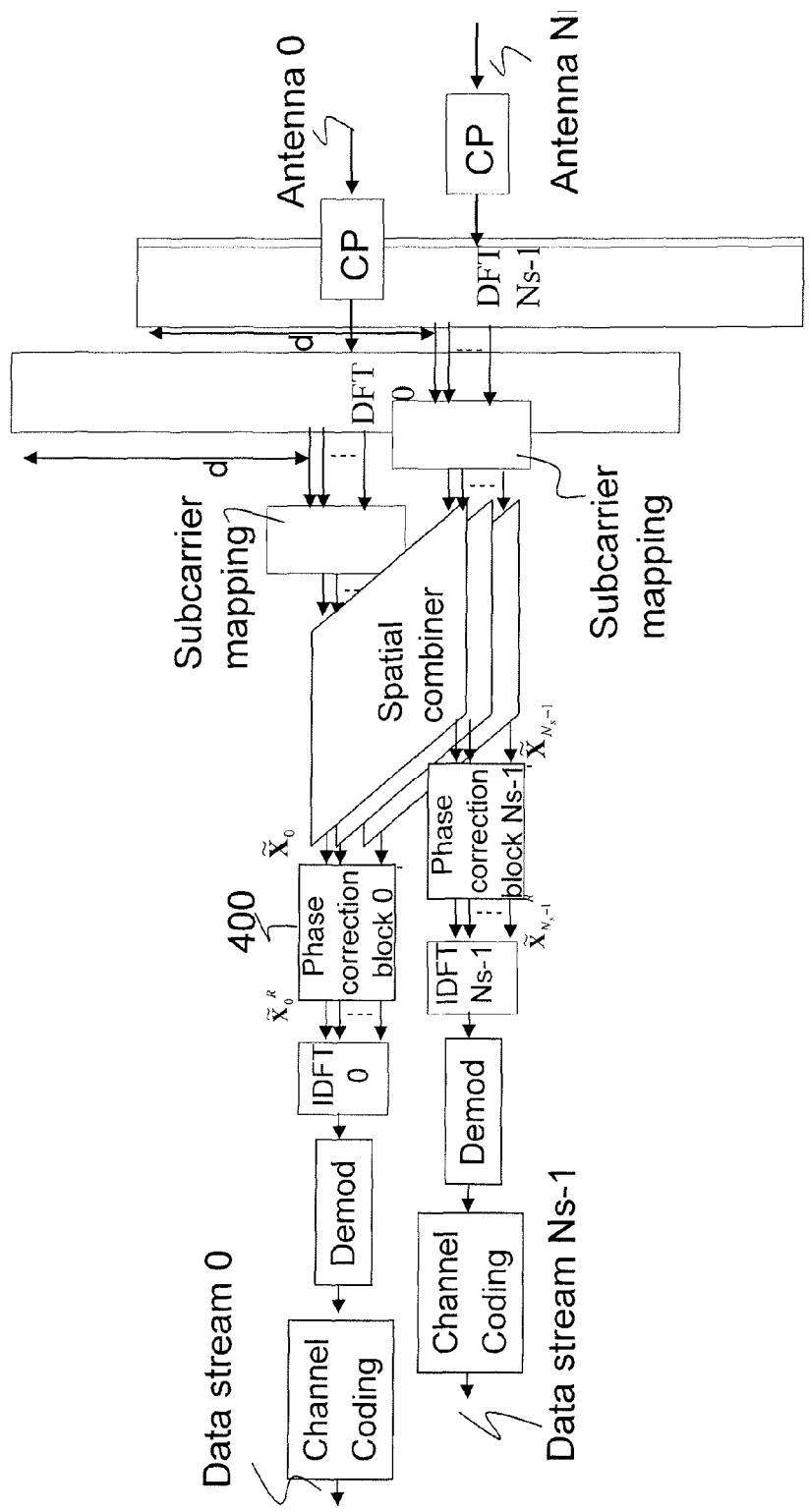
FIG. 4 illustrates a MIMO DFTS-OFDM receiver according to one embodiment of the present invention.
Figure 5:
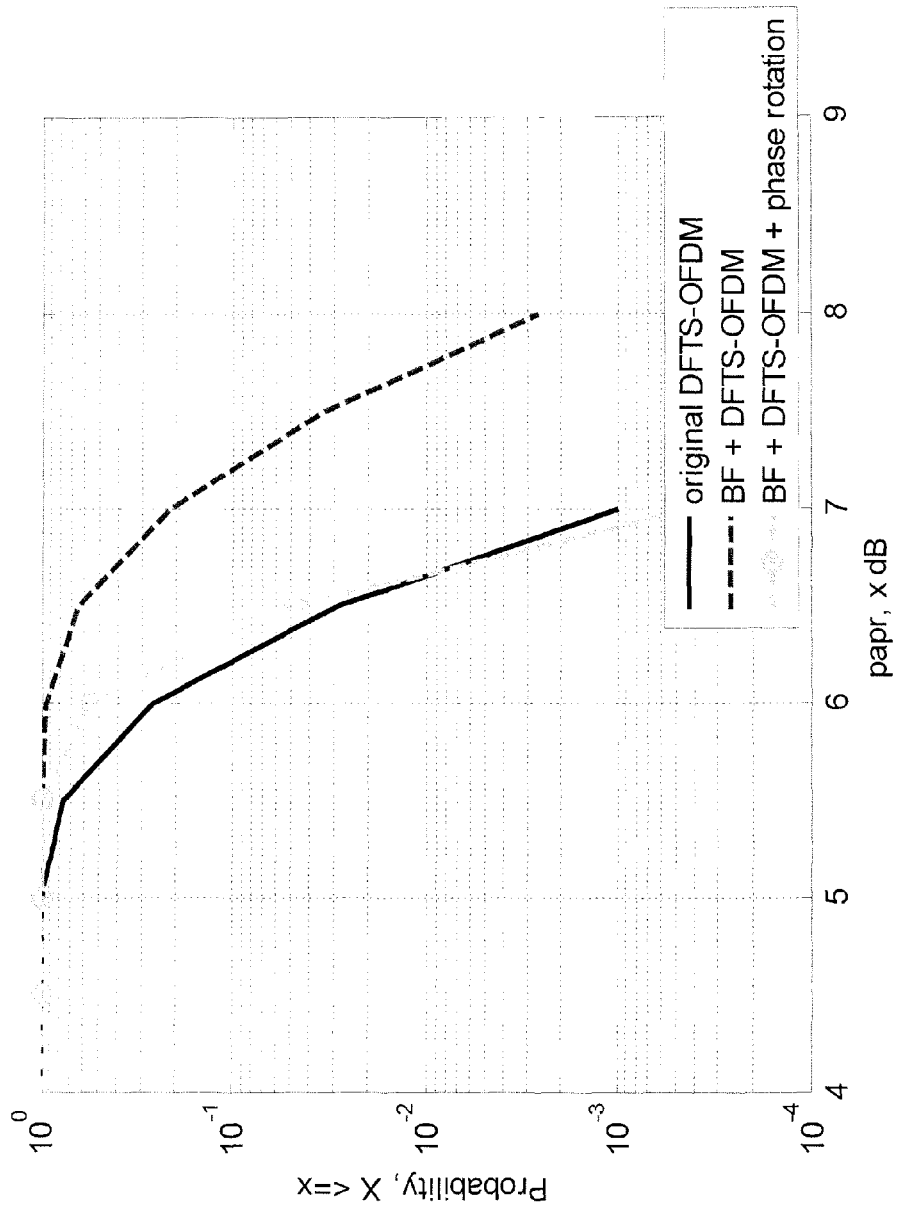
FIG. 5 illustrates that the PAPR is reduced with the MIMO DFTS-OFDM system according to one embodiment of the present invention.

According to an embodiment of the present invention, the phase rotation block can be applied to an output of each DFT in a MIMO DFTS-OFDM system as illustrated in FIG. 3. A corresponding receiver is disclosed in FIG. 4. The transmitter of FIG. 3 corresponds to the transmitter of FIG. 1a with the addition of the phase rotation block 300. A subsequent spatial processing block combines the phase rotated signals generated by each DFT and delivers them to an antenna specific IDFT and PA. It can be shown that the probability that the signals after the IDFT will be combined constructively and generate a power spike is reduced by applying the proposed phase rotation which results in circular time shifts. This is proved by numerical simulations which show a significant reduction of the PAPR as illustrated in FIG. 5.

According to this embodiment, the time-shifts are efficiently introduced by the applied linear phase rotation block 300 between each DFT and the BF block at the transmitter side. An equivalent compensation phase factor is applied at the receiver by the phase correction block 400. In the following, more details are provided about how the phase term is introduced at the transmitter and receiver in conjunction with FIGS. 3 and 4.

A signal at the output of the n-th DFT in the transmitter is defined as $X_n(z)$ with $0 \leq z \leq K$. Similarly, the signal at the input of the n-th IDFT in the receiver is denoted $\tilde{X}_n(z)$. A possible implementation of the present invention is achieved by applying a phase rotation block to $X_n(z)$ and a corresponding inverse phase rotation to $\tilde{X}_n(z)$. The phase rotation applied to each sample of $X_n(z)$ is defined as:

$$X_n^R(z)=X_n(z)\exp(-j2\pi\phi_n z/M+\theta_n). \quad (3)$$

Similarly, the phase correction to be applied to $\tilde{X}_n(z)$ is:

$$\tilde{X}_n^R(z)=\tilde{X}_n(z)\exp(j2\pi\phi_n z/M-\theta_n) \quad (4)$$

$\phi_n$ and $\theta_n$ in equations (3) and (4) are specific parameters for each n-th DFT precoder. A person skilled in the art can easily understand that the phase correction ter in at the receiver compensates the phase offset introduced at the transmitter, and the signal $\tilde{X}_n^R(z)$ at the input of the n-th IDFT decoder at the receiver coincides with the signal that would be seen in the original MIMO DFTS-OFDM system. Therefore, the proposed PAPR reduction technique is transparent to most of the blocks in the system and does not alter the performance in teens of error probability or similar metrics.

By signal processing arguments it is possible to prove that the effect of the phase rotation term in equation (3) is a circular time-shift on the signal generated by the n-th DFT precoder at the output of the IDFT modulator. It can be shown that the length of the shift is equal to $\phi_n$ samples. Besides the time-shift, the signal results also in a phase shift equal to $\theta_n$ radians.

When the values of $\phi_n$ and $\theta_n$ are properly set, the signals generated by each DFT precoder can be maximally scrambled in the time domain, thus resulting in reduced PAPR. The optimal values of $\phi_n$ and $\theta_n$ depend mainly on the sizes of the DFTs K, on M and Ns. They may be found either by numerical simulations or theoretical analysis. In one implementation both the receiver and the transmitter are aware of an a-priori table reporting the desired values for $\phi_n$ and $\theta_n$ for each supported combination of K, M and Ns.

Another possible implementation is based on the signaling of the values of $\phi_n$ and $\theta_n$ from the transmitter to the receiver via a suitable protocol or control message.

In the following the PAPR reduction of the invention is assessed through numerical simulations. A system with Ntx=2 tx antennas and Ns=2 streams carriers, each with K=256 subcarriers, is considered (d=0). The IFFT consists of M=2048 subcarriers and both streams employ QPSK modulation. The BF matrix is the same for all the subcarrier, i.e.:

$$B(k) = B = \begin{bmatrix} 1 & 1 \\ 1 & -1 \end{bmatrix} / \sqrt{2}.$$

parameters of the linear phases are $$\begin{cases} \varphi_n = \dfrac{M}{KN_s} n \\ \vartheta_n = \dfrac{\pi}{2N_s} n \end{cases}$$

with $0 \leq n \leq N_s - 1$.

FIG. 5 shows the CCDF (Complementary Cumulative Distribution Function) of the PAPR. The PAPR is evaluated in each OFDM symbol as:

$$PAPR = \frac{\|y(t)\|_\infty^2}{P_y},$$

where y(t) is the transmitted baseband symbol and Py is its power. A significant reduction of more than 1 dB is achieved for BF+DFTS-OFDM+phase rotation compared to BF+DFTS-OFDM.

It should be acknowledged that smaller PAPR reduction is obtained for denser modulations such as 16QAM and 64QAM. It is also observed that PAPR limits the maximum power that is reliably provided by the PA. In case of power control and coverage limited scenarios (e.g., cell edge users), maximum power is likely to be required in conjunction with QPSK modulation, when the proposed PAPR reduction scheme is most effective.

Figure 6:
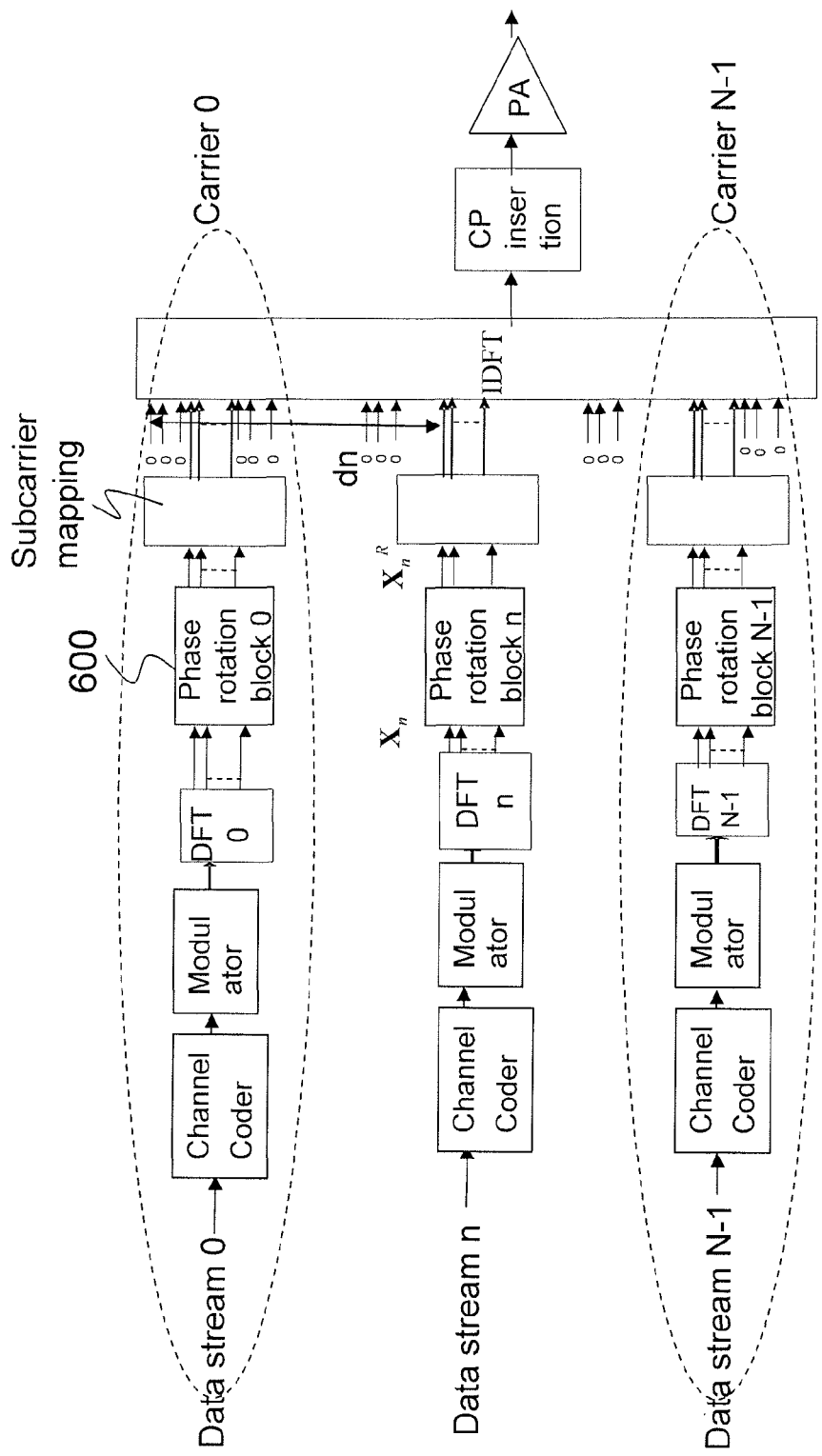
FIG. 6 illustrates a multicarrier OFDM transmitter according to one embodiment of the present invention.
Figure 7:
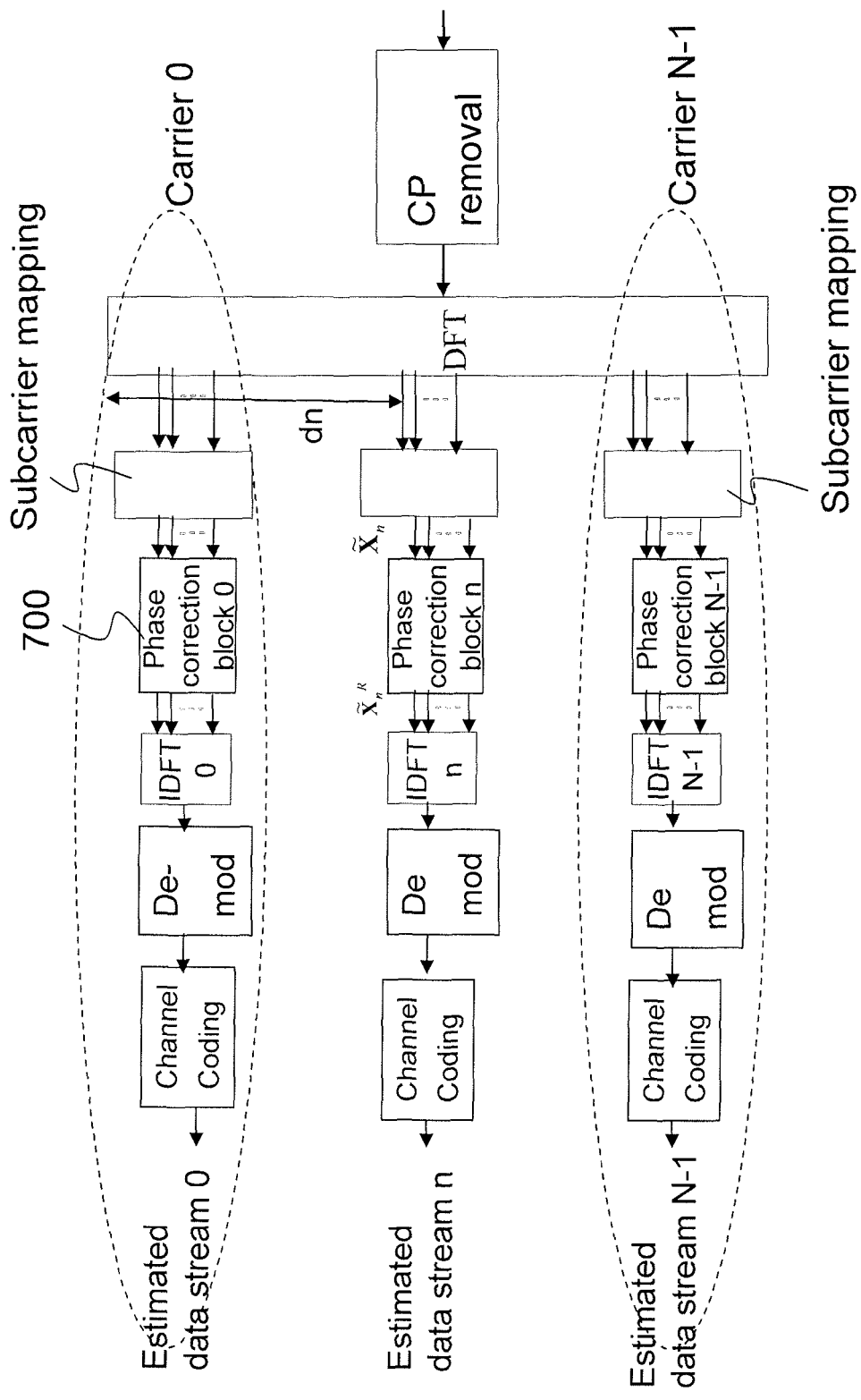
FIG. 7 illustrates a multicarrier OFDM receiver according to one embodiment of the present invention.

As stated above, the present invention also concerns an embodiment with multi-carrier OFDM also referred to as NxDFT-OFDM. "N" denotes the number of DFT precoders and hence the number of carriers. Hence, the idea to apply the phase rotation block to an output of each DFT is also applied to the NxDFTS-OFDM transmitter/receiver as illustrated in FIGS. 6 and 7. It can be shown that the probability that the samples generated by the N DFT precoders will constructively sum and generate a power spike is reduced by applying the proposed circular shifts. This is proved by numerical simulation to translate into a significant reduction of the PAPR (more than 1 dB for the spikes with probability of $10^{-3}$) and some smaller reduction of the peak values of the CM.

Figure 1B:
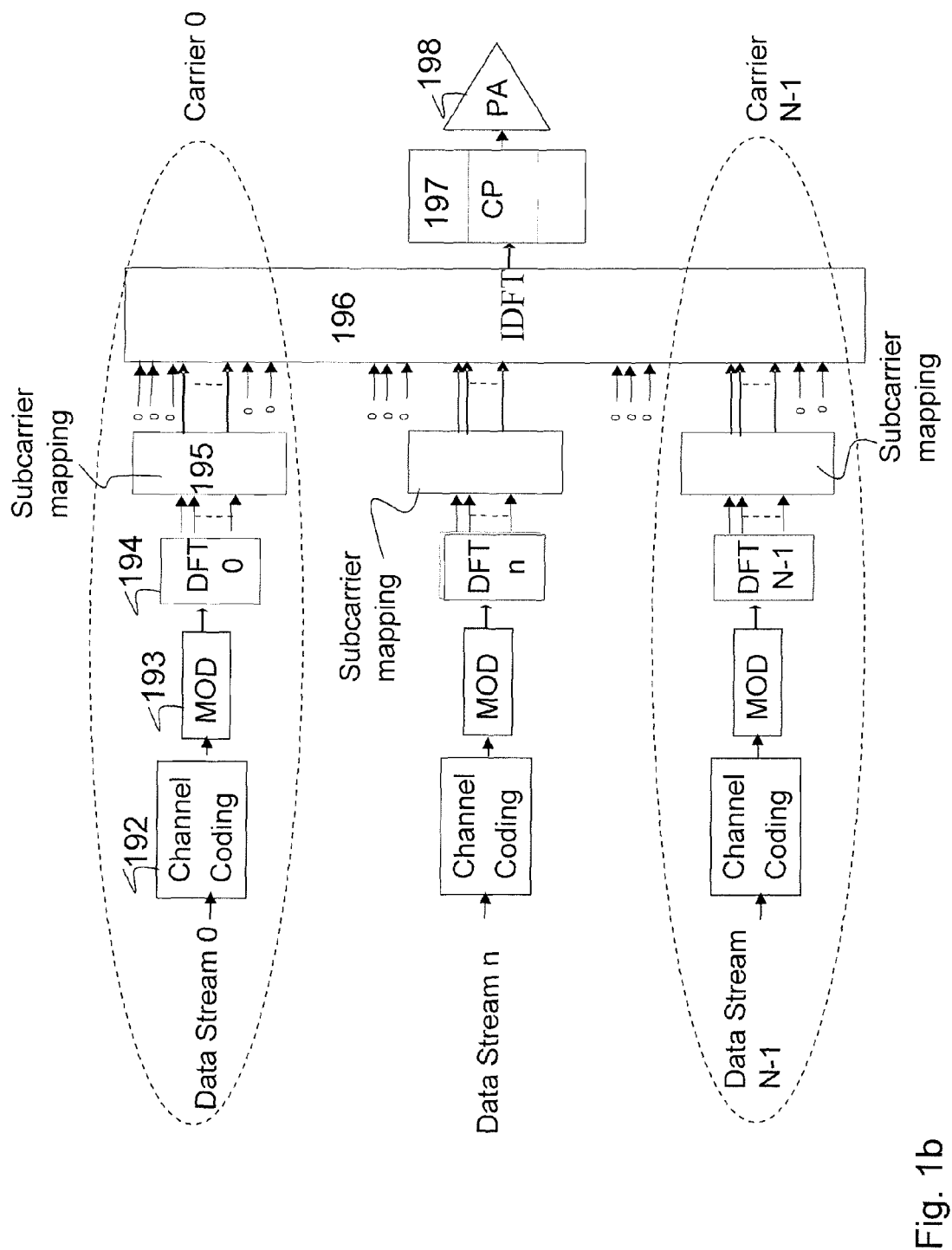
FIG. 1b illustrates a conventional NxDFTS-OFDM system according to prior art.

The linear phase rotation block 600 applied in the frequency domain (between each DFT and the IDFT) at the transmitter side introduces efficiently time shifts in the time domain. A corresponding phase correction 700 is applied at the receiver. In the following, more details are provided about how the phase term is introduced at the transmitter and receiver in conjunction with FIGS. 6 and 7. FIG. 6 corresponds to FIG. 1b with the addition of the phase rotation block.

The signal at the output of the n-th DFT in the transmitter is defined as $X_n(z)$ with $0 \leq z \leq K_n$. Similarly, the signal at the input of the n-th IDFT in the receiver is denoted as $\tilde{X}_n(z)$. The preferred implementation of the proposed technique is achieved by applying a phase rotation block to $X_n(z)$ and a corresponding inverse phase rotation to $\tilde{X}_n(z)$. The phase rotation applied to each sample of $X_n(z)$ is defined as:

$$X_n^R(z) = X_n(z) \exp(-j2\pi \phi_n z / M + \theta_n). \tag{5}$$

Similarly, the phase correction to be applied to $\tilde{X}_n(z)$ is:

$$\tilde{X}_n^R(z) = \tilde{X}_n(z) \exp(j2\pi \phi_n z / M - \theta_n) \tag{6}$$

$\phi_n$ and $\theta_n$ in equations (5) and (6) are specific parameters for each n-th DFT precoder. A person skilled in the art can easily understand that the phase correction term at the receiver compensates the phase offset introduced at the transmitter, and the signal $\tilde{X}_n^R(z)$ at the input of the n-th IDFT decoder at the receiver coincides with the signal that would be seen in the original NxDFTS-OFDM system. Therefore, the proposed PAPR reduction technique is transparent to most of the blocks in the system and does not alter the performance in terms of error probability or similar metrics.

According to well known signal processing theory, it is possible to prove that the effect of the phase rotation term in equation (1) is a circular time-shift on the signal generated by the n-th DFT precoder at the output of the IDFT modulator. It can be shown that the length of the shift is equal to $\phi_n$ samples. Besides the time-shift, the phase rotated signal results also in a phase shift equal to $\theta_n$ radians.

When the values of $\phi_n$ and $\theta_n$ are properly set, the signals generated by each DFT precoder can be maximally scrambled in the time domain, thus resulting in reduced PAPR. The optimal values of $\phi_n$ and $\theta_n$ depend mainly on the sizes of the DFTs Kn, on M and on dn. They may be found either by numerical simulations or theoretical analysis. In a possible implementation of the present invention both the receiver and the transmitter are aware of an a-priori table reporting the desired values for $\phi_n$ and $\theta_n$ for each supported combination of Kn, M and dn. In a practical system, the number of supported combinations is likely to be reduced to a rather limited set.

Another possible implementation is based on the signaling of the values of $\phi_n$ and $\theta_n$ from the transmitter to the receiver via a suitable protocol or control message.

In the following the PAPR reduction of the invention is assessed through numerical simulations. A system with N=2 carriers, each with Kn=512 subcarriers, is considered (d0=0, d1=1024). The IFFT consists of M=2048 subcarriers and both carriers employ QPSK modulation. The parameters of the linear phases are $\phi_1=0$, $\phi_2=2$, $\theta_1=0$, $\theta_2=\pi/4$.

Figure 8:
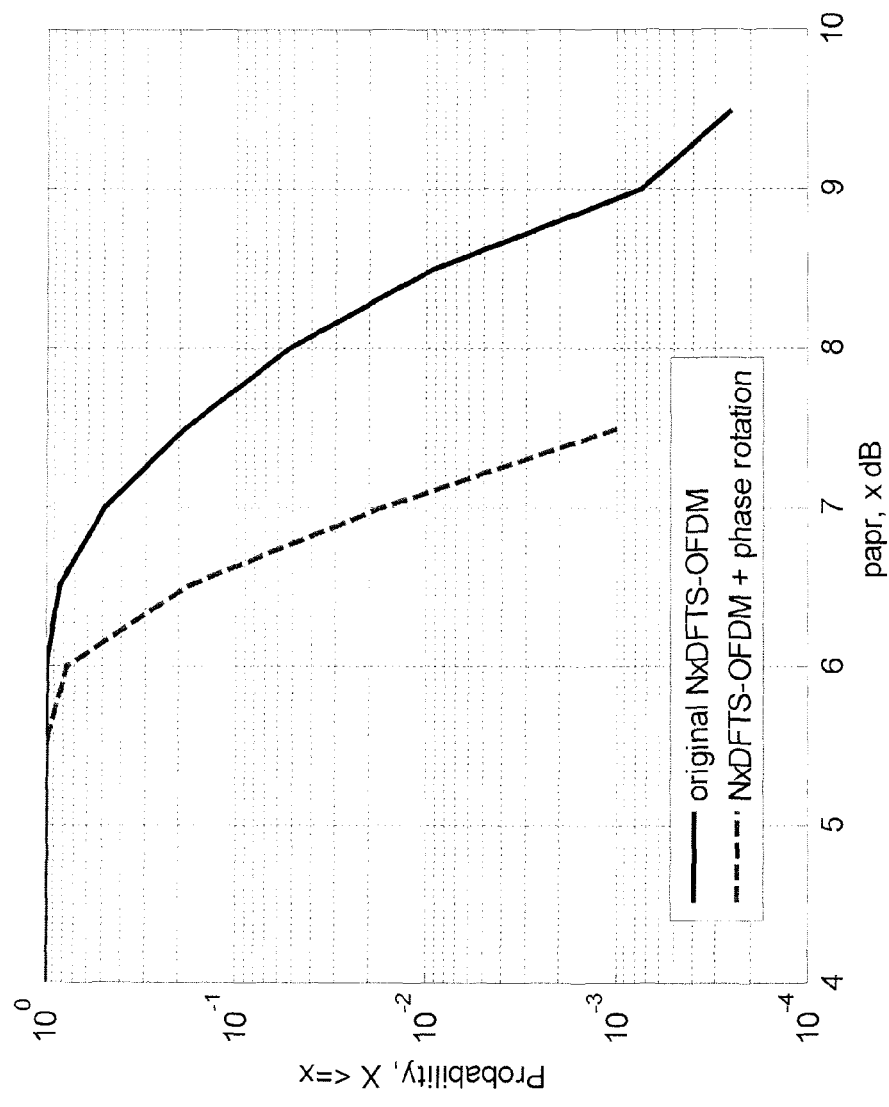
FIG. 8 illustrates that the PAPR is reduced with the multicarrier OFDM system according to one embodiment of the present invention.

FIG. 8 shows the CCDF of the PAPR. The PAPR is evaluated in each OFDM symbol as:

$$PAPR = \frac{\|y(t)\|_\infty^2}{P_y},$$

where y(t) is the transmitted baseband symbol and Py is its power. A significant reduction of ~1.5 dB is achieved.

Figure 9:
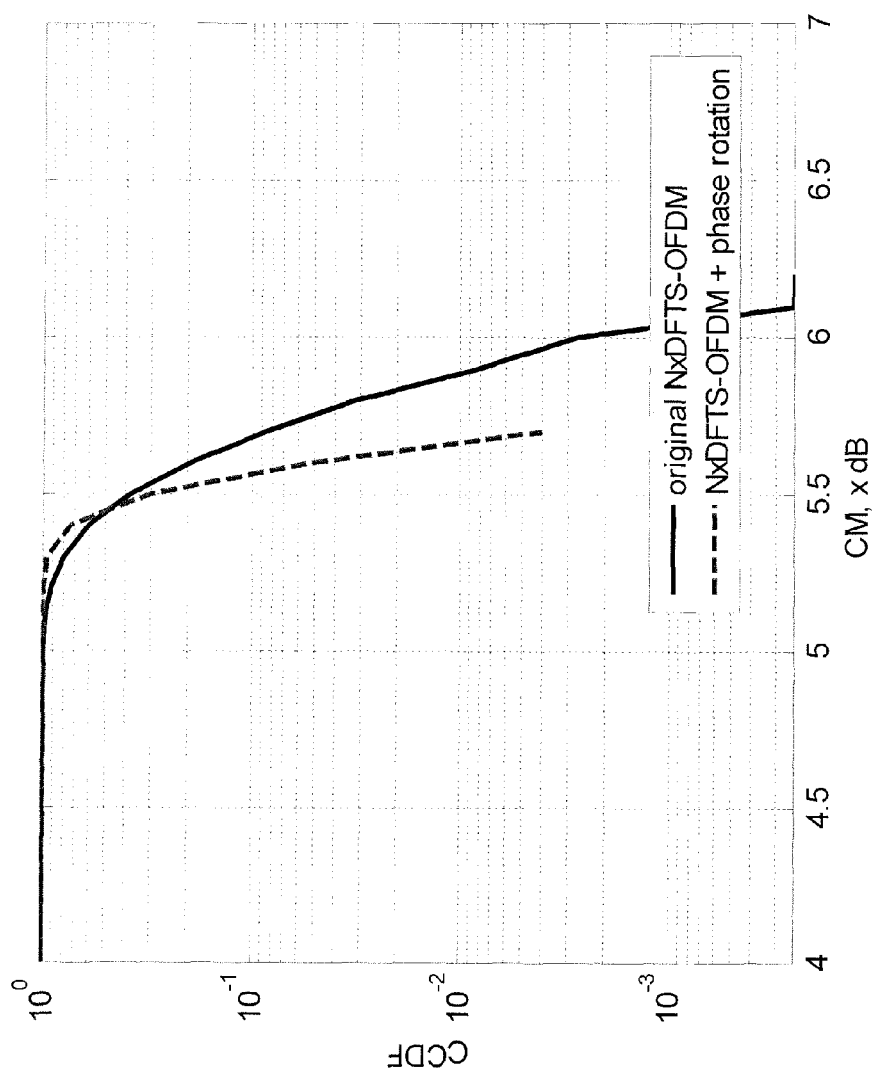
FIG. 9 illustrates that the CM is reduced with the multicarrier OFDM system according to one embodiment of the present invention.

FIG. 9 shows the CCDF of the CM. The CM is evaluated in each OFDM symbol as [1]:

$$CM = 20\log_{10}\left[\text{rms}\left[\left(\frac{|y(t)|}{\text{rms}(y(t))}\right)^3\right]\right].$$

It can be seen that even though the average CM is roughly unchanged, the probability of occurrence of symbols with very high CM is reduced by the invention.

It should be acknowledged similar to FIG. 5 that smaller PAPR reduction is obtained for denser modulations such as 16QAM and 64QAM (~0.7 dB PAPR reduction in the reference simulation for 64QAM). It is also observed that PAPR limits the maximum power that is reliably provided by the PA. In case of power control and coverage limited scenarios (e.g., cell edge users), maximum power is likely to be required in conjunction with QPSK modulation, when the proposed PAPR reduction scheme is most effective.

Figure 10:
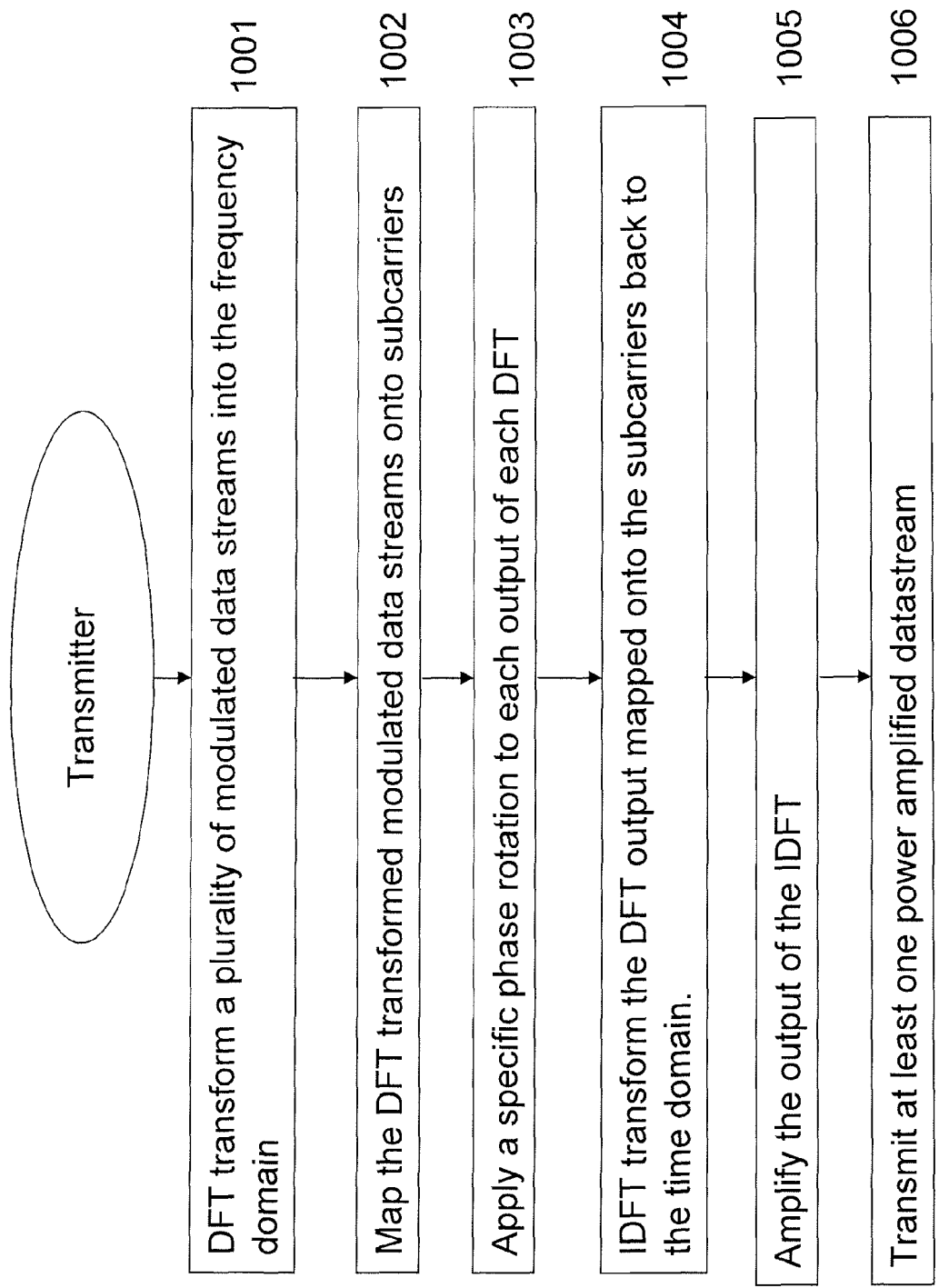
FIG. 10 is a flowchart illustrating the method in the transmitter.

Moreover, the present invention relates to methods in a transmitter and a receiver, respectively. In the method in the transmitter as illustrated in FIG. 10, a plurality of modulated data streams are DFT transformed into the frequency domain 1001 and the DFT transformed modulated data streams are mapped 1002 onto subcarriers. According to the present invention, a specific phase rotation is applied 1003 to each output of each DFT, where the value of the phase rotation is a linear function of a subcarrier index. The DFT output mapped onto the subcarriers is inverse DFT transformed 1004 back to the time domain. Then the output of the IDFT is amplified 1005 and transmitted 1006.

Figure 11:
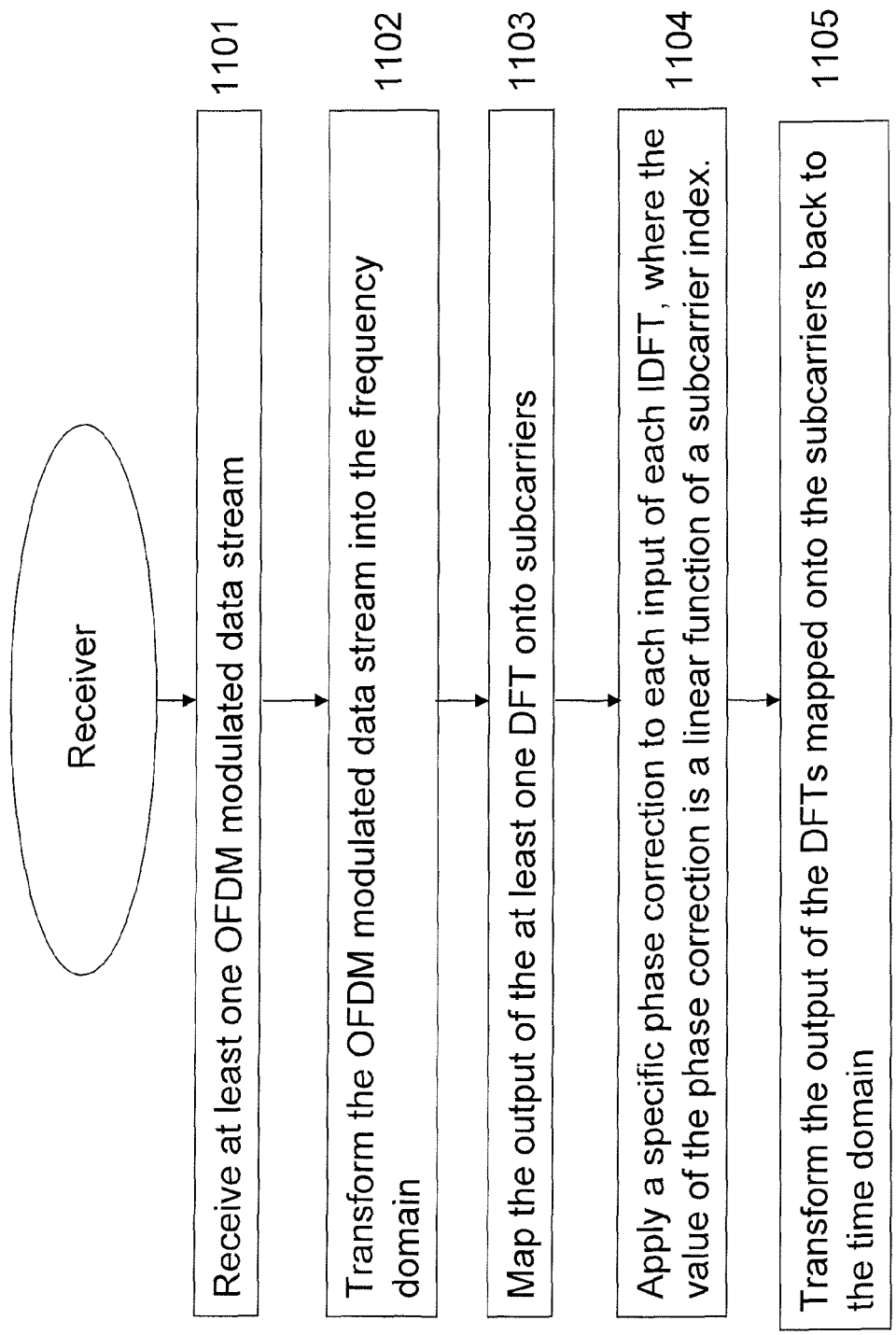
FIG. 11 is a flowchart illustrating the method in the receiver.

In the method in the receiver as illustrated in FIG. 11, at least one OFDM modulated data stream is received 1101, the OFDM modulated data stream is transformed 1102 into the frequency domain and the output of the at least one DFT is mapped 1103 onto subcarriers. According to the present invention a specific phase correction is applied 1104 to each input of each IDFT, where the value of the phase correction is a linear function of a subcarrier index. Further, the output of the DFTs mapped onto the subcarriers back is transformed 1105 back to the time domain.

It should be noted that the time shifts caused by the phase rotation may be integer or fractional time shifts.

The above described embodiments of the present invention is based on the application of phase shifts at the output of the DFT precoders and corresponding phase compensation blocks at the receiver because this implementation allows great flexibility in the magnitude of the correspondent circular time shifts in the time domain signal at the output of the DFT modulators with limited computational cost. However, it has to be observed that all the baseband blocks in the transmitter chain perform linear operations and they can therefore be moved in the chain and substituted by equivalent blocks, according to the superimposition principle of linear operations. As an example, the phase rotation operation in the frequency domain according to the present invention is equivalent to a circular time shift (possibly fractional) in the time domain. Therefore, an equivalent transmitter architecture may be achieved where the phase shifts are substituted by circular time shifts blocks operating in the time domain, i.e., after the IDFT modulator. A fractional time shift may be performed, e.g., by means of a circular convolution of the signal at the output of the IDFT modulator with a properly sampled sinc function. Corresponding changes may be applied to the receiver chain.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:
1. An Orthogonal Frequency Division Multiplexing (OFDM) transmitter comprising:
a plurality of modulators configured to apply multicarrier OFDM modulation to generate a plurality of modulated data streams, wherein the number of modulated data streams corresponds to the number of carriers of the applied multi carrier OFDM modulation;
a plurality of Discrete Fourier Transformers (DFTs) configured to transform the plurality of modulated data streams into the frequency domain;
a plurality of phase rotation blocks each configured to apply a specific phase rotation to each output of a respective DFT, wherein the value of that specific phase rotation is a linear function of a subcarrier index;
a plurality of subcarrier mappers configured to map the output of the DFTs, as phased rotated by the phase rotation blocks, onto subcarriers;
at least one Inverse DFT (IDFT) configured to transform the output of the DFTs, as mapped onto the subcarriers, back to the time domain; and
at least one power amplifier configured to amplify the output of the at least one IDFT
wherein the OFDM transmitter is configured to transmit at least one power amplified data stream from the at least one power amplifier; and
wherein the value of the specific phase rotation applied to each output of the respective DFT depends at least on the number of carriers of the multicarrier OFDM modulation applied, the length of the at least one IDFT, the distance of a first mapped subcarrier of the DFT from the first input of the at least one IDFT, and the length of the DFT.

2. The OFDM transmitter according to claim 1, wherein parameters defining the value of a specific phase rotation are specific to each DFT.

3. The OFDM transmitter according to claim 1, wherein the output of a phase rotation block is configured to be input to a subcarrier mapper.

4. The OFDM transmitter according to claim 1, further comprising one or more antennas configured to wirelessly transmit the at least one power amplified data stream.

5. The OFDM transmitter according to claim 4, wherein the one or more antennas comprise a plurality of antennas configured for wireless Multiple Input Multiple Output (MIMO) transmission, wherein the number of said antennas corresponds to the number of modulated data streams.

6. The OFDM transmitter according to claim 5, wherein the at least one IDFT comprises a plurality of IDFTs that are each antenna specific, and wherein the OFDM transmitter further comprises a spatial processing block configured to combine the output of the DFTs, as phased rotated by the phase rotation blocks, and to deliver the combined output to the plurality of IDFTs, via said plurality of subcarrier mappers.

7. The OFDM transmitter according to claim 5, wherein the value of a specific phase rotation depends at least on the number of power amplified data streams to be transmitted.

8. The OFDM transmitter according to claim 1, further comprising a number of digital-to-analogue converters and analogue processing circuits configured to transmit the at least one power amplified data stream via wired Multiple Input Multiple Output (MIMO) transmission, wherein the number of digital-to-analogue converters and analogue processing circuits corresponds to the number of modulated data streams.

9. The OFDM transmitter according to claim 1, wherein the specific phase rotations are defined according to a predefined function in the OFDM transmitter.

10. The OFDM transmitter according to claim 1, further configured to send information indicating the specific phase rotations in a control message.

11. An Orthogonal Frequency Division Multiplexing (OFDM) receiver configured to receive at least one OFDM modulated data stream and comprising:
a number of analogue-to-digital converters and analogue processing circuits configured to receive the at least one OFDM modulated data stream via wired Multiple Input Multiple Output (MIMO) reception, wherein the number of analogue-to-digital converters and analogue processing circuits corresponds to the number of received OFDM modulated data streams;

at least one Discrete Fourier Transformer (DFT) configured to transform the at least one OFDM modulated data stream into the frequency domain;

a plurality of subcarrier demappers configured to demap the output of the at least one DFT onto subcarriers;

a plurality of phase correction blocks each configured to apply a specific phase correction to each output of a respective subcarrier demapper, wherein the value of that specific phase correction is a linear function of a subcarrier index; and a plurality of inverse DFTs (IDFTs) each configured to transform the output of a respective phase correction block back to the time domain;

wherein the value of the specific phase correction depends at least on the number of received OFDM modulated data streams, the length of the at least one IDFT, the distance of a first mapped subcarrier of the IDFT from the first input of the at least one DFT, and the length of the IDFT.

12. The OFDM receiver according to claim 11, wherein parameters defining the value of a specific phase correction are specific to each IDFT.

13. The OFDM receiver according to claim 11, wherein the OFDM receiver is configured for multicarrier OFDM.

14. The OFDM receiver according to claim 11, further comprising one or more antennas configured to wirelessly receive the at least one OFDM modulated data stream.

15. The OFDM receiver according to claim 14, wherein the one or more antennas comprise a plurality of antennas configured for wireless Multiple Input Multiple Output (MIMO) reception, wherein the number of said antennas corresponds to the number of OFDM modulated data streams received.

16. The OFDM receiver according to claim 11, wherein the specific phase corrections are defined according to a predefined function in the OFDM transmitter.

17. The OFDM receiver according to claim 11, further configured to receive information indicating the specific phase corrections in a control message.

18. A method implemented by an Orthogonal Frequency Division Multiplexing (OFDM) transmitter, comprising:

applying multicarrier OFDM modulation using a plurality of modulators to generate a plurality of modulated data streams, wherein the number of modulated data streams corresponds to the number of carriers of the applied multi carrier OFDM modulation;

transforming at a plurality of Discrete Fourier Transformers (DFTs) the plurality of modulated data streams into the frequency domain;

applying a specific phase rotation to each output of a respective DFT, wherein the value of that specific phase rotation is a linear function of a subcarrier index;

mapping the output of the DFTs, as phased rotated, onto subcarriers;

transforming at one or more inverse DFTs (IDFTs) the output of the DFTs, as mapped onto the subcarriers, back to the time domain;

amplifying the output of the one or more IDFTs to obtain at least one power amplified data stream; and transmitting the at least one power amplified data stream;

wherein the value of the specific phase rotation applied to each output of the respective DFT depends at least on the number of carriers of the multicarrier OFDM modulation applied, the length of the at least one IDFT, the distance of a first mapped subcarrier of the DFT from the first input of the at least one IDFT, and the length of the DFT.

19. A method implemented by an Orthogonal Frequency Division Multiplex (OFDM) receiver, comprising:

receiving at least one OFDM modulated data stream via wired Multiple Input Multiple Output (MIMO) reception using a number of analogue-to-digital converters and analogue processing circuits, wherein the number of analogue-to-digital converters and analogue processing circuits corresponds to the number of received OFDM modulated data streams;

transforming at one or more Discrete Fourier Transformers (DFTs) the at least one OFDM modulated data stream into the frequency domain;

mapping at a plurality of subcarrier demappers the output of the one or more DFTs onto subcarriers;

applying at each of a plurality of phase correction blocks a specific phase correction to each output of a respective subcarrier demapper, wherein the value of that specific phase correction is a linear function of a subcarrier index; and transforming the output of each phase correction block back to the time domain;

wherein the value of the specific phase correction depends at least on the number of received OFDM modulated data streams, the length of the at least one IDFT, the distance of a first mapped subcarrier of the IDFT from the first input of the at least one DFT, and the length of the IDFT.

* * * * *